US012279342B2

(12) United States Patent
Chen et al.

(10) Patent No.: US 12,279,342 B2
(45) Date of Patent: Apr. 15, 2025

(54) SELF-REGULATING ELECTRIC HEATING FILM AND PREPARATION METHOD AND USE THEREOF

(71) Applicant: Beihang University, Beijing (CN)

(72) Inventors: Huawei Chen, Beijing (CN); Yantong Zhu, Beijing (CN); Zelinlan Wang, Beijing (CN); Xiaolin Liu, Beijing (CN); Zehui Zhao, Beijing (CN); Jichen Chen, Beijing (CN)

(73) Assignee: Beihang University, Beijing (CN)

( * ) Notice: Subject to any disclaimer, the term of this patent is extended or adjusted under 35 U.S.C. 154(b) by 962 days.

(21) Appl. No.: 17/360,846

(22) Filed: Jun. 28, 2021

(65) Prior Publication Data

US 2022/0240351 A1 Jul. 28, 2022

(30) Foreign Application Priority Data

Jan. 27, 2021 (CN) ........................ 202110107591.2

(51) Int. Cl.
*H05B 1/02* (2006.01)
*H01C 1/14* (2006.01)
(Continued)

(52) U.S. Cl.
CPC ......... *H05B 1/0294* (2013.01); *H01C 1/1406* (2013.01); *H01C 7/02* (2013.01); *H05B 3/02* (2013.01); *H05B 3/03* (2013.01); *H05B 3/06* (2013.01); *H05B 3/145* (2013.01); *H05B 3/20* (2013.01); *H05B 3/86* (2013.01); *H05B 2203/013* (2013.01); *H05B 2203/02* (2013.01);
(Continued)

(58) Field of Classification Search
None
See application file for complete search history.

(56) References Cited

U.S. PATENT DOCUMENTS

| | | | | |
|---|---|---|---|---|
| 4,354,092 A * | 10/1982 | Manabe | .................. | H05B 3/42 219/505 |
| 2014/0261380 A1* | 9/2014 | Rademacher | ......... | A61F 7/0097 126/263.01 |
| 2017/0257910 A1* | 9/2017 | Oldenzijl | ......... | H01C 17/06586 |

FOREIGN PATENT DOCUMENTS

| | | |
|---|---|---|
| CN | 106111499 A * | 11/2016 |
| CN | 111607292 A * | 9/2020 |

(Continued)

OTHER PUBLICATIONS

CN 106111499 A (Chen, Hua-Wei et al.) Nov. 16, 2016 [retrieved on Sep. 28, 2024]. Retrieved from Foreign Image and Text Database , translation by Clarivate Analytics. (Year: 2016).*

(Continued)

*Primary Examiner* — John J Norton
(74) *Attorney, Agent, or Firm* — DLA PIPER LLP (US)

(57) ABSTRACT

The present disclosure provides a self-regulating electric heating film, including: an insulating isolation layer, an interdigital electrode arranged on the surface of the insulating isolation layer, a positive temperature coefficient coating covering the surface of a secondary electrode of the interdigital electrode, and an insulating protective layer covering the surface of a primary electrode of the interdigital electrode, wherein the positive temperature coefficient coating is not in contact with the primary electrode of the interdigital electrode, and the insulating protective layer overlaps the positive temperature coefficient coating.

7 Claims, 5 Drawing Sheets

(51) Int. Cl.

| | |
|---|---|
| ***H01C 7/02*** | (2006.01) |
| ***H05B 3/02*** | (2006.01) |
| ***H05B 3/03*** | (2006.01) |
| ***H05B 3/06*** | (2006.01) |
| ***H05B 3/14*** | (2006.01) |
| ***H05B 3/20*** | (2006.01) |
| ***H05B 3/86*** | (2006.01) |

(52) U.S. Cl.
CPC .... *H05B 2203/035* (2013.01); *H05B 2214/02* (2013.01); *H05B 2214/04* (2013.01)

(56) References Cited

FOREIGN PATENT DOCUMENTS

| | | | | |
|---|---|---|---|---|
| JP | 2009151976 | A | * | 7/2009 |
| JP | 2009176549 | A | * | 8/2009 |
| JP | 2009266631 | A | * | 11/2009 |
| JP | 2010020989 | A | * | 1/2010 |
| JP | 2011003329 | A | * | 1/2011 |
| JP | 2011003330 | A | * | 1/2011 |
| JP | 2012227034 | A | * | 11/2012 |
| KR | 102133343 | B1 | * | 7/2020 |

OTHER PUBLICATIONS

CN 111607292 A (Huang, Jian-Xin et al.) Sep. 1, 2020 [retrieved on Sep. 28, 2024]. Retrieved from Foreign Image and Text Database, translation by Clarivate Analytics. (Year: 2020).*

JP 2011-003329 A (Nakajima, Keizo et al.) Jan. 6, 2011 [retrieved on Sep. 28, 2024]. Retrieved from Foreign Image and Text Database, translation by Clarivate Analytics. (Year: 2011).*

* cited by examiner

SELF-REGULATING ELECTRIC HEATING FILM AND PREPARATION METHOD AND USE THEREOF

CROSS REFERENCE TO RELATED APPLICATION

This patent application claims the benefit and priority of Chinese Patent Application No. 202110107591.2 filed on Jan. 27, 2021, the disclosure of which is incorporated by reference herein in its entirety as part of the present application.

TECHNICAL FIELD

The present disclosure belongs to the technical field of the electric heating film, and particularly relates to a self-regulating electric heating film and a preparation method and use thereof.

BACKGROUND

At present, electric heating films have been widely used in many fields, such as heat preservation and heating for equipment or space, anti-icing and de-icing for surfaces of equipment such as an aircraft. The principle of electric heating of the film is based on Joule's law, which realizes electric heating by applying a certain voltage, and thus it is possible to change the "solid-solid" contact between an aircraft surface and ice into "solid-liquid" contact, thereby reducing the adhesion of the ice on the surface and achieving the anti-icing and de-icing effect. At present, electric heating films are mainly sprayed on the surface of an insulating substrate to form an integrated structural and functional part. Generally, the insulating substrate is a structural layer composed of glass fiber composite layer or polymer materials such as polyetheretherketone, and the sprayed electric heating film is a metal coating. When the film is electrified to be heated, if there is a covering locally, it is easy to cause local heat accumulation, resulting in an excessive temperature, which will damage the electric heating film, and even more seriously cause the covering to burn and cause a fire accident, thus failing to achieve the anti-icing and de-icing effect. Therefore, it is necessary to improve the electric heating film to realize a self-regulating heating, so as to achieve an excellent anti-icing and de-icing effect.

SUMMARY

An object of the present disclosure is to provide a self-regulating electric heating film and a preparation method and use thereof. The electric heating film provided by the present disclosure has a strong PTC effect, and could achieve anti-icing and de-icing effect by self-regulating electric heating when an appropriate voltage is applied.

To achieve the above object, the present disclosure provides the following technical solutions.

The present disclosure provides a self-regulating electric heating film, comprising an insulating isolation layer; an interdigital electrode arranged on the surface of the insulating isolation layer; a positive temperature coefficient coating covering the surface of a secondary electrode of the interdigital electrode; and an insulating protective layer covering the surface of a primary electrode of the interdigital electrode; wherein the positive temperature coefficient coating is not in contact with the primary electrode of the interdigital electrode; and the insulating protective layer overlaps the positive temperature coefficient coating.

In some embodiments, the positive temperature coefficient coating comprises the following components: 20-40 wt % of a nano conductive filler, 10-30 wt % of a positive temperature coefficient thermosensitive filler, 10-30 wt % of a polymer, and a balance of a phase-change material.

In some embodiments, the nano conductive filler includes at least one selected from the group consisting of graphene, conductive carbon black, carbon nanotube, nano graphite powder, a nano metal powder, and a nano metal wire.

In some embodiments, the positive temperature coefficient thermosensitive filler includes at least one selected from the group consisting of ethylene-vinyl acetate copolymer (EVA), a positive temperature coefficient ceramic powder, polycaprolactone, paraffin wax, and thermoplastic polyurethane.

In some embodiments, the phase-change material includes at least one selected from the group consisting of a low-temperature lubricating oil, a low-temperature grease, and paraffin wax.

In some embodiments, an overlap between the insulating protective layer and the positive temperature coefficient coating has a width of not less than 5 mm.

In some embodiments, the insulating protective layer covers both the primary electrode of the interdigital electrode and a part of the insulating isolation layer.

In some embodiments, the insulating isolation layer has a thickness of 10-30 μm; the positive temperature coefficient coating has a thickness of 30-90 μm; the insulating protective layer has a thickness of 10-30 μm.

The present disclosure further provides a method for preparing the self-regulating electric heating film as described in the above technical solutions, comprising:

- preparing the insulating isolation layer, the positive temperature coefficient coating and the insulating protective layer independently by spraying.

The present disclosure further provides use of the self-regulating electric heating film as described in the above technical solutions or the self-regulating electric heating film prepared by the method as described in the above technical solutions in the anti-icing and de-icing filed.

Embodiments of the present disclosure provide a self-regulating electric heating film, comprising: an insulating isolation layer, an interdigital electrode arranged on the surface of the insulating isolation layer, a positive temperature coefficient coating covering the surface of a secondary electrode of the interdigital electrode, and an insulating protective layer covering the surface of a primary electrode of the interdigital electrode, wherein the positive temperature coefficient coating is not in contact with the primary electrode of the interdigital electrode, and the insulating protective layer overlaps the positive temperature coefficient coating. The electric heating film according to the present disclosure comprises an insulating isolation layer, an interdigital electrode arranged on the surface of the insulating isolation layer, a positive temperature coefficient (PTC) coating covering the surface of a secondary electrode of the interdigital electrode, and an insulating protective layer covering the surface of a primary electrode of the interdigital electrode, wherein the primary electrode of the interdigital electrode is not in contact with PTC coating, avoiding excessive high resistance of the primary electrode, which would adversely affect the transmission of electric energy; when an external voltage is applied thereto, an electric energy is transmitted to the secondary electrode through the primary electrode of the interdigital electrode, and then to the PTC coating by the secondary electrode; due to the PTC effect of the coating, after the coating is heated to a certain temperature, its resistance would increase, thereby decreasing the heating power, and having an automatic temperature regulating effect. Therefore, the electric heating film exhibits a self-regulating temperature performance, and thus could be used for anti-icing and de-icing. The results of the examples show that when the electric heating film according to the disclosed embodiments has a resistivity of 0.01 Ω·m, it exhibits an intensity of PTC effect that reach above 25 times, and a good self-regulating temperature effect and droplet slip performance.

DETAILED DESCRIPTION OF THE EMBODIMENTS

Embodiments of the present disclosure provide a self-regulating electric heating film, comprising an insulating isolation layer; an interdigital electrode arranged on the surface of the insulating isolation layer; a positive temperature coefficient coating covering the surface of a secondary electrode of the interdigital electrode; and an insulating protective layer covering the surface of a primary electrode of the interdigital electrode, wherein the positive temperature coefficient coating is not in contact with the primary electrode of the interdigital electrode; and the insulating protective layer overlaps the positive temperature coefficient coating.

Figure 1:
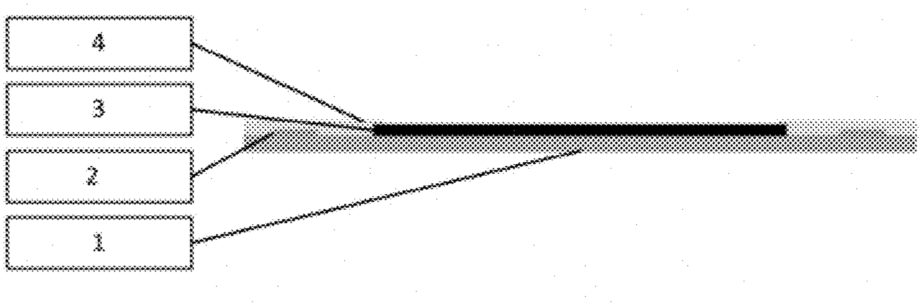
FIG. 1 shows a schematic sectional view of the structure of a self-regulating electric heating film according to the present disclosure, wherein 1 represents an insulating isolation layer, 2 represents an interdigital electrode, 3 represents a positive temperature coefficient coating, and 4 represents an insulating protective layer.

As shown in FIG. 1, in the present disclosure, the self-regulating electric heating film comprises an insulating isolation layer 1. In some embodiments, the insulating isolation layer is made of raw materials comprising an insulating polymer, an organic solvent and a nano-particle with a heat-insulating function or a heat-conducting function. In the present disclosure, the insulating isolation layer mainly plays an insulation protection role, and a nano-particle with a heat-insulating function or heat-conducting function could be added therein if desired.

In some embodiments, the insulating polymer is at least one selected from the group consisting of polyurethane, silicone rubber, high-density polyethylene and acrylonitrile-butadiene-styrene copolymer. According to the present disclosure, there is no special limitation on the source of the insulating polymer, and any commercially available product well known to those skilled in the art may be used. In the present disclosure, the insulating polymer plays an insulating role.

In some embodiments, the organic solvent is at least one selected from the group consisting methylbenzene, dimethylbenzene, and acetone. According to the present disclosure, there is no special limitation on the source of the organic solvent, and any commercially available product well known to those skilled in the art may be used. In the present disclosure, the organic solvent is used to dissolve the insulating polymer and the nano-particle with a heat-insulating function or a heat-conducting function. In some embodiments, a mass ratio of the insulating polymer to the organic solvent is in the range of 1:(10-20), preferably 1:(15-18).

In some embodiments, the nano-particle with a heat-insulating function is at least one selected from the group consisting of hollow glass microspheres and an aerogel particle. In some embodiments, the nano-particle with a heat-conducting function is at least one selected from the group consisting of cubic boron nitride, nano-silica, and nano-alumina. According to the present disclosure, there is no special limitation on the source of the nano-particle with a heat-insulating function and the nano-particle with a heat-conducting function, and any commercially available products well known to those skilled in the art may be used. According to the present disclosure, there is no special limitation on the particle size of the nano-particle with a heat-insulating function and the nano-particle with a heat-conducting function, and sub-micron and nano-scale particles may be used. In the present disclosure, the nano-particle with a heat-insulating function plays a heat-insulating role; the nano-particle with a heat-conducting function plays a heat-conducting role. The nano-particle with a heat-insulating function is added when a insulating isolation layer with a heat-insulating function is needed, while the nano-particle with a heat-conducting function is added when an insulating isolation layer with a heat-conducting function is needed. In some embodiments, a mass ratio of the insulating polymer to the nano-particle with a heat-insulating function or a heat-conducting function is in the range of 1:(0.5-3), preferably 1:(1-2).

In some embodiments, the insulating isolation layer has a thickness of 10-30 μm, preferably 20-25 μm.

As shown in FIG. 1, according to the present disclosure, the self-regulating electric heating film comprises an interdigital electrode 2 arranged on the surface of the insulating isolation layer 1. In some embodiments, the interdigital electrode is made of at least one selected from the group consisting of a metal, carbon fiber, and a conductive silver adhesive-type conductive polymer. In some embodiments, the metal is copper. According to some embodiments of the present disclosure, there is no special limitation on the sources of the metal, the carbon fiber, and the conductive silver paste-type conductive polymer, and any commercially available product well known to those skilled in the art may be used. In the present disclosure, the interdigital electrode is used to transmit electric energy.

Figure 2:
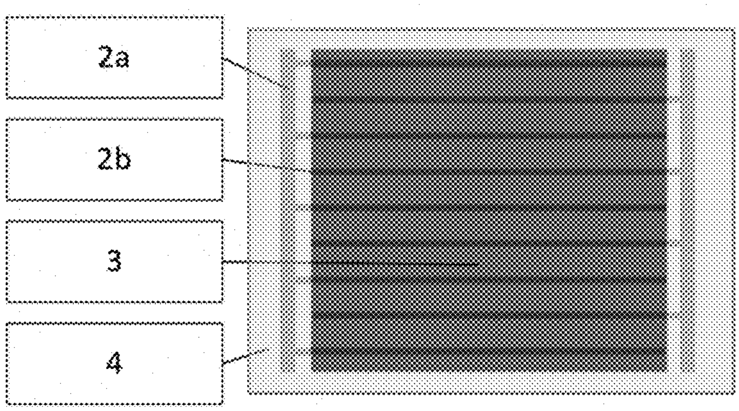
FIG. 2 shows a schematic top view of the structure of a self-regulating electric heating film according to the present disclosure, wherein 2*a* represents a primary electrode of the interdigital electrode, 2*b* represents a secondary electrode of the interdigital electrode, 3 represents a positive temperature coefficient coating, and 4 represents an insulating protective layer.

As shown in FIG. 2, in some embodiments of the present disclosure, the interdigital electrode 2 comprises a primary electrode 2*a* and a secondary electrode 2*b*; the number of primary electrodes 2*a* is 2, which are arranged in parallel, and a plurality of secondary electrodes 2*b* are arranged equidistantly and parallelly distributed between the two primary electrodes 2*a*. According to some embodiments of the present disclosure, there is no special limitation on the number of the secondary electrode 2*b* and the distance between two adjacent secondary electrodes 2*b*, which could be adjusted according to requirements. In some embodiments, the primary electrode 2*a* is connected with the secondary electrode 2*b* by a means selected from the group consisting of a metal thermal spraying, a metal sputtering, a conductive adhesive bonding, a solder welding, a copper foil engraving, and an integrated molding. According to some embodiments of the present disclosure, there is no special limitation on the specific operation of the above connecting means, and any operation well known to those skilled in the art may be used. In some embodiments of the present disclosure, the arrangement of the primary electrode and the secondary electrode of the interdigital electrode almost eliminates the uneven resistance caused by PTC effect, thus greatly improving the heating uniformity.

As shown in FIG. 1, in some embodiments of the present disclosure, the self-regulating electric heating film comprises a positive temperature coefficient coating 3 covering the surface of the secondary electrode 2*b* of the interdigital electrode, and the positive temperature coefficient coating 3 is not in contact with the primary electrode 2*a* of the interdigital electrode. In some embodiments of the present disclosure, the positive temperature coefficient coating is not in contact with the primary electrode of the interdigital electrode, avoiding excessive high resistance of the primary electrode, which would adversely affect the transmission of electric energy; the positive temperature coefficient coating covers the surface of the secondary electrode of the interdigital electrode, which could transmit an electric energy in the secondary electrode to the positive temperature coefficient (PTC) coating; due to the PTC effect of the coating, after the coating is heated to a certain temperature, its resistance would increase, thereby decreasing the heating power, and having an automatic temperature regulating effect. Therefore, the electric heating film exhibits a self-regulating temperature performance, and thus could be used for anti-icing and de-icing.

As shown in FIG. 2, in some embodiments of the present disclosure, the positive temperature coefficient coating 3 further covers the portion between the secondary electrodes 2*b* on the surface of the insulating isolation layer 1.

In some embodiments, the positive temperature coefficient coating comprises the following components: 20-40 wt % of a nano conductive filler, 10-30 wt % of a positive temperature coefficient thermosensitive filler, 10-30 wt % of a polymer, and a balance of a phase-change material.

In some embodiments, the positive temperature coefficient coating comprises 20-40 wt % of a nano conductive filler, preferably 25-35 wt %, and further preferably 27-30 wt %. In some embodiments, the nano conductive filler includes at least one selected from the group consisting of graphene, conductive carbon black, carbon nanotube, nano graphite powder, a nano metal powder, and a nano metal wire. In some embodiments, the nano conductive filler is a mixture of conductive carbon black and carbon nanotube; in some embodiments, a mass ratio of conductive carbon black to carbon nanotube is 5:1. According to some embodiments of the present disclosure, there is no special limitation on the source of the nano conductive filler, and any commercially available product well known to those skilled in the art may be used. According to some embodiments of the present disclosure, there is no special limitation on the particle size of the nano conductive filler, and sub-micron and nano-scale particles may be used. In some embodiments of the present disclosure, the nano conductive filler selected from the above substances and within the above content range could ensure the adjustability in the resistivity.

In some embodiments, the positive temperature coefficient coating comprises 10-30 wt % of a positive temperature coefficient thermosensitive filler (PTC filler), preferably 15-25 wt %, and further preferably 17-20 wt %. In some embodiments, the positive temperature coefficient thermosensitive filler includes at least one selected from the group consisting of ethylene-vinyl acetate copolymer, a positive temperature coefficient ceramic powder, polycaprolactone, paraffin wax and thermoplastic polyurethane. According to some embodiments of the present disclosure, there is no special limitation on the source of the positive temperature coefficient thermosensitive filler, and any commercially available product well known to those skilled in the art may be used. According to some embodiments of the present disclosure, there is no special limitation on the particle size of the positive temperature coefficient thermosensitive filler, and sub-micron and nano-scale positive temperature coefficient thermosensitive fillers may be used. In the present disclosure, the positive temperature coefficient thermosensitive filler selected from the above substances and within the above content range brings about further enhanced the PTC effect.

In some embodiments, the positive temperature coefficient coating comprises 10-30 wt % of a polymer, preferably 15-25 wt %, and further preferably 17-20 wt %. In some embodiments, the polymer includes at least one selected from the group consisting of silicone rubber, phenolic epoxy resin, thermoplastic polyurethane, styrene butadiene rubber and polyurethane. According to some embodiments of the present disclosure, there is no special limitation on the source of the polymer, and any commercially available product well known to those skilled in the art may be used. In the present disclosure, the polymer is used as a substrate.

In some embodiments, the positive temperature coefficient coating comprises a balance of a phase-change material. In some embodiments, the phase-change material includes at least one selected from the group consisting of a low-temperature lubricating oil, a low-temperature grease, and paraffin wax. According to some embodiments of the present disclosure, there is no special limitation on the source of the phase-change material, and any commercially available product well known to those skilled in the art may be used. In the present disclosure, the phase-change material selected from the above substances results in a further adjustment in the "solid-liquid" state transition temperature on the surface of the electric heating film, which would make the film exhibit a liquid-like surface during the electric heating, thereby improving ice-phobic performance, while exhibit a solid surface at ambient temperature, thereby improving the antifouling ability of the electric heating film.

In some embodiments, the positive temperature coefficient coating has a thickness of 30-90 μm, preferably 40-80 μm, and further preferably 50-60 μm. In some embodiments of the present disclosure, the positive temperature coefficient coating having the above thickness results in a further enhanced the PTC effect of the positive temperature coefficient coating.

As shown in FIG. 1, in some embodiments of the present disclosure, the self-regulating electric heating film comprises an insulating protective layer 4 covering the surface of the primary electrode 2*a* of the interdigital electrode; the insulating protective layer 4 overlaps the positive temperature coefficient coating 3. In some embodiments, the insulating protective layer 4 covers both the primary electrode 2*a* of the interdigital electrode and a part of the insulating isolation layer 1. In some embodiments of the present disclosure, the insulating protective layer plays a insulating isolation role.

As shown in FIG. 1, in some embodiments, the insulating protective layer 4 overlaps the positive temperature coefficient layer 3 near the primary electrode 2*a*.

In some embodiments, an overlap between the insulating protective layer 4 and the positive temperature coefficient coating 3 has a width of not less than 5 mm. In some embodiments, the above width of the overlap between the insulating protective layer and the positive temperature coefficient coating could ensure the joint between the primary electrode and the secondary electrode not exposed, thus avoiding adversely affecting the performance of the electric heating film.

In some embodiments, the components of raw materials of the insulating protective layer is the same as those of the insulating isolation layer, which will not be described in detail herein.

In some embodiments, the insulating protective layer has a thickness of 10-30 μm, and preferably 15-20 μm.

The electric heating film according to some embodiments of the present disclosure comprises an insulating isolation layer, an interdigital electrode arranged on the surface of the insulating isolation layer, a positive temperature coefficient (PTC) coating covering the surface of a secondary electrode of the interdigital electrode and an insulating protective layer covering the surface of a primary electrode of the interdigital electrode, wherein the primary electrode of the interdigital electrode is not in contact with the PTC layer, thus avoiding to excessive resistance of the primary electrode, which would adversely affect the transmission of electric energy; when an external voltage is applied thereto, an electric energy is transmitted to the secondary electrode through the primary electrode of the interdigital electrode, and then to the PTC coating by the secondary electrode; due to the PTC effect of the coating, after the coating is heated to a certain temperature, its resistance would increase, thereby decreasing the heating power, and having an automatic temperature regulating effect. Therefore, the electric heating film exhibits a self-regulating temperature performance, and thus could be used for anti-icing and de-icing.

The electric heating film according to some embodiments of the present disclosure has a thickness of not more than 150 μm, and exhibits a good flexibility and mechanical strength, and its flexibility, wear resistance and other mechanical strength could be adjusted by adjusting the type and mass ratio of polymers therein; the resistivity of the film is as low as 0.01 Ω·m; when the film has a resistivity of 0.01 Ω·m, its PTC effect could reach more than 25 times, and the higher the resistivity, the greater the PTC effect; when an external voltage is applied, the electric heating film exhibit an excellent uniformity in heating, thus realizing anti-icing and de-icing by self-regulating electric heating; in addition, the ice layer on the surface of the electric heating film would undergo an obvious "solid-liquid" state transition with the increase in temperature, significantly improving the droplet slip performance, that is to say, the surface of the film exhibits a liquid-like surface during the electric heating, which significantly improves ice-phobic performance, while exhibits a solid surface at ambient temperature, which significantly improves the anti-fouling performance of the sliding surface. Thus, the electric heating film could be used in an aircraft and other equipments for self-regulating anti-icing and de-icing; moreover, the electric heating film provides a possibility for realizing novel "liquid-liquid" electric heating anti-icing and de-icing technology.

According to some embodiments of the present disclosure, the PTC coating is arranged close to the outer surface, which could be used to melt the ice deposited on the surface to form a liquid film under the action of electric heating, accompanying with the phase change action of the phase-change material, thereby forming a "liquid-liquid" interface, thus greatly improving the anti-icing and de-icing performance, and decreasing the temperature and the heating power for anti-icing and de-icing.

Embodiments of the present disclosure further provides a method for preparing the above self-regulating electric heating film, comprising preparing the insulating isolation layer, the positive temperature coefficient coating and the insulating protective layer independently by spraying.

In some embodiments, the method comprises mixing an insulating polymer, a nano-particle with a heat-insulating function or a heat-conducting function, and an organic solvent; spraying the resulting mixture onto a substrate; and drying to obtain an insulating isolation layer; arranging an interdigital electrode on the insulating isolation layer; dissolving a nano conductive filler, a positive temperature coefficient thermosensitive filler, a polymer and a balance of a phase-change material in an organic solvent; spraying the resulting dispersion to cover the secondary electrode of the interdigital electrode; and drying to obtain a positive temperature coefficient coating; mixing an insulating polymer, a nano-particle with a heat-insulating function or a heat-conducting function and an organic solvent; spraying the resulting mixture to cover the primary electrode of the interdigital electrode and a part of the positive temperature coefficient coating; and drying to obtain an insulating protective layer In some embodiments, an insulating polymer, a nano-particle with a heat-insulating function or a heat-conducting function and an organic solvent are mixed, and the resulting mixture is sprayed onto a substrate, and then dried to obtain an insulating isolation layer.

In some embodiments of the present disclosure, the insulating polymer, the nano-particle with a heat-insulating function or a heat-conducting function and an organic solvent are mixed under mechanical stirring and ultrasonic condition. In some embodiments, the insulating polymer, the nano-particle with a heat-insulating function or a heat-conducting function and an organic solvent are mixed for 15-30 min, and preferably 20-25 min. According to some embodiments of the present disclosure, there is no special limitation on the operation of mechanical stirring and ultrasonic condition, as long as a uniform system could be achieved within aforementioned duration.

In some embodiments, the spraying for preparing the insulating isolation layer is driven by a compressed air. According to some embodiments of the present disclosure, there is no special limitation on the operation of driving by a compressed air, and any operation well known to those skilled in the art may be used.

According to some embodiments of the present disclosure, there is no special limitation on the means for drying, as long as a constant weight could be obtained by the thermal baking.

In some embodiments of the present disclosure, a nano conductive filler, a positive temperature coefficient thermosensitive filler, a polymer and a balance of a phase-change material are dissolved in an organic solvent, and the resulting dispersion is sprayed, and dried to obtain a positive temperature coefficient coating.

In some embodiments, the organic solvent used for preparing the positive temperature coefficient coating is the same as that used for preparing the above insulating isolation layer and will not be described in detail herein. According to some embodiments of the present disclosure, there is no special limitation on the amount of the organic solvent, as long as the raw materials could be dissolved.

In some embodiments, the nano conductive filler, the positive temperature coefficient thermosensitive filler, the polymer and the balance of the phase-change material are dissolved in an organic solvent for 15-30 min, and preferably 20-25 min; in some embodiments, the nano conductive filler, the positive temperature coefficient thermosensitive filler, the polymer and the balance of the phase-change material are dissolved in an organic solvent under mechanical stirring and ultrasonic condition. According to some embodiments of the present disclosure, there is no special limitation on the operation for mechanical stirring and ultrasonic condition, as long as a uniform system could be achieved within aforementioned duration.

In some embodiments, the spraying for preparing the positive temperature coefficient coating is a thermal spraying; in some embodiments, the thermal spraying comprises preheating the surface to be sprayed; in some embodiments, the surface to be sprayed is preheated to a temperature of 50-60° C., and preferably 55-58° C.; in some embodiments, a mixed solution in a spray gun used in the spraying has a temperature of 50-60° C., and preferably 55-58° C. In some embodiments of the present disclosure, the temperature of the mixed solution in the spray gun and the preheating temperature defined in the above range could not only prevent the mixed solution from being cooled or over-temperature denaturation, but also accelerate the volatilization of the organic solvent.

In some embodiments, the drying is a thermal baking at a constant temperature; in some embodiments, the constant temperature is in the range of 50–60° C., and preferably 55-60° C. In the present disclosure, the thermal baking at a constant temperature is beneficial to a complete volatilization of the organic solvent. According to the present disclosure, there is no special limitation on the time for drying, as long as the positive temperature coefficient coating exhibits a stable resistance.

In some embodiments of the present disclosure, an insulating polymer, a nano-particle with a heat-insulating function or a heat-conducting function and an organic solvent are mixed, and the resulting mixture is sprayed, and dried to obtain an insulating protective layer.

In some embodiments, the operation for mixing the insulating polymer, the nano-particle with a heat-insulating function or a heat-conducting function and the organic solvent is the same as the operation for mixing raw materials of the insulating isolation layer, which will not be described in detail herein.

In some embodiments, the operation of praying is the same as that in preparing the insulating isolation layer, which will not be described in detail herein.

In some embodiments, the operation for drying is the same as that in preparing the positive temperature coefficient coating, which will not be described in detail herein.

The method provided by the present disclosure is simple and feasible and is suitable for industrial production.

Embodiments of the present disclosure further provides use of the above self-regulating electric heating film or the self-regulating electric heating film prepared by the above method in the anti-icing and de-icing filed.

According to some embodiments of the present disclosure, there is no special limitation on the operation of the use of the self-regulating electric heating film in the anti-icing and de-icing filed, and any operations according to the conventional electric heating film may be used.

The self-regulating electric heating film according to some embodiments of the present disclosure has an excellent anti-icing and de-icing effect in the anti-icing and de-icing filed.

The technical solution of the present disclosure will be described clearly and completely below in combination with the embodiments of the present disclosure. Obviously, the described embodiments are only part of the embodiments of the present disclosure, not all of them. Based on the embodiments of the present disclosure, all other embodiments obtained by those of ordinary skill in the art without creative labor shall fall within the scope of the present disclosure.

Example 1

A schematic sectional view of the structure of the self-regulating electric heating film according to this example is shown in FIG. 1, wherein 1 represents an insulating isolation layer, 2 represents an interdigital electrode, 3 represents a positive temperature coefficient coating, and 4 represents an insulating protective layer.

Figure 3:
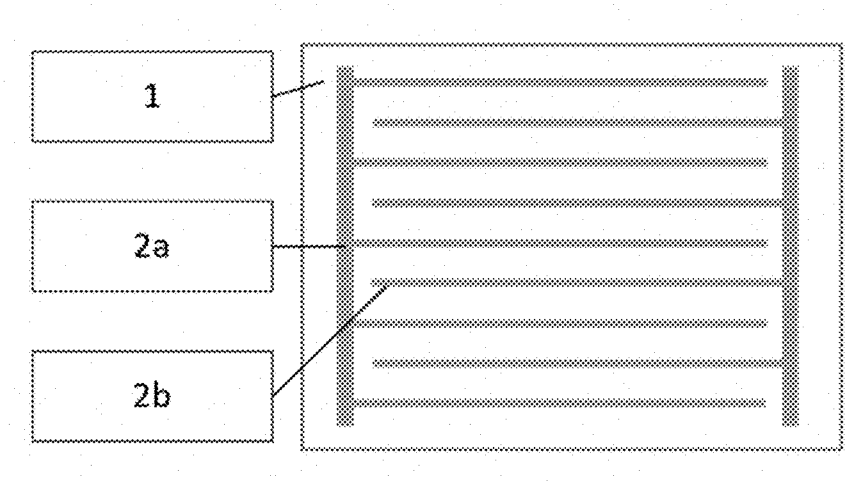
FIG. 3 shows an arrangement of the interdigital electrode on the insulating isolation layer according to Example 2, wherein 1 represents an insulating isolation layer, 2*a* represents a primary electrode of the interdigital electrode, and 2*b* represents a secondary electrode of the interdigital electrode.

According to this example, an arrangement of the interdigital electrode on the insulating isolation layer is shown in FIG. 3, wherein 1 represents an insulating isolation layer, 2*a* represents a primary electrode of the interdigital electrode, and 2*b* represents a secondary electrode of the interdigital electrode.

As shown in FIGS. 1 and 3, a self-regulating electric heating film is composed of an insulating isolation layer 1, an interdigital electrode 2 arranged on the surface of the insulating isolation layer 1, a positive temperature coefficient coating 3 covering the surface of secondary electrodes 2*b* of the interdigital electrode 2, and an insulating protective layer 4 covering the surface of primary electrodes 2*a* of the interdigital electrode 2, wherein the positive temperature coefficient coating 3 is not in contact with the primary electrodes 2*a* of the interdigital electrode; and the insulating protective layer 4 overlaps the positive temperature coefficient coating 3.

Example 2

A schematic sectional view of the structure of the self-regulating electric heating film according to this example is shown in FIG. 1, wherein 1 represents an insulating isolation layer, 2 represents an interdigital electrode, 3 represents a positive temperature coefficient coating, 4 represents an insulating protective layer.

A schematic top view of the structure of the self-regulating electric heating film according to this example is shown in FIG. 2, wherein 2*a* represents a primary electrode of the interdigital electrode, 2*b* represents a secondary electrode of the interdigital electrode, 3 represents a positive temperature coefficient coating, and 4 represents an insulating protective layer.

As shown in FIGS. 1 and 2, a self-regulating electric heating film according to Example 2 is composed of an insulating isolation layer 1, an interdigital electrode 2 arranged on the surface of the insulating isolation layer 1, a positive temperature coefficient coating 3 covering the surface of secondary electrodes 2*b* of the interdigital electrode and an insulating protective layer 4 covering the surface of primary electrodes 2*a* of the interdigital electrode, wherein the positive temperature coefficient coating 3 is not in contact with the primary electrodes 2*a* of the interdigital electrode; the positive temperature coefficient coating 3 also covers portions between the secondary electrodes 2*b* on the surface of the insulating isolation layer 1; an overlap between the insulating protective layer 4 and the positive temperature coefficient coating 3 near the primary electrodes 2*a* has a width of 5 mm; the insulating protective layer 4 covers both the primary electrodes 2*a* of the interdigital electrode and a part of the insulating isolation layer 1.

The insulating isolation layer, having a thickness of 20 μm was prepared by the following raw materials: polyurethane, dimethylbenzene, hollow glass microspheres and an organic solvent, wherein a mass ratio of polyurethane to the organic solvent was 1:10, a mass ratio of polyurethane to the hollow glass microspheres was 1:1, An arrangement of the interdigital electrode on the insulating isolation layer according to Example 2 was shown in FIG. 3, wherein 1 represented an insulating isolation layer, 2*a* represented a primary electrode of the interdigital electrode, 2*b* represented a secondary electrode of the interdigital electrode.

As shown in FIG. 3, the interdigital electrode 2 was composed of a primary electrode 2*a* and a secondary electrode 2*b*; the number of primary electrodes was 2, which were arranged in parallel, and nine secondary electrodes 2*b* were parallelly distributed between the two primary electrodes 2*a* at an equal interval of 2 cm, wherein the primary electrodes 2*a* were connected with the secondary electrodes 2*b* by soldering welding; the interdigital electrode was made of copper.

The positive temperature coefficient coating was composed of the following components: 20 wt % of conductive carbon black and carbon nanotube (a mass ratio of conductive carbon black to carbon nanotube was 5:1), 30 wt % of EVA, 30 wt % of polyurethane and 20 wt % of paraffin wax; the positive temperature coefficient coating had a thickness of 50 μm.

The insulating protective layer had a thickness of 20 μm, and was prepared by the following raw materials: polyurethane, dimethylbenzene and cubic boron nitride, wherein a mass ratio of polyurethane to dimethylbenzene was 1:10, and a mass ratio of polyurethane to cubic boron nitride is 1:1.

Figure 4:
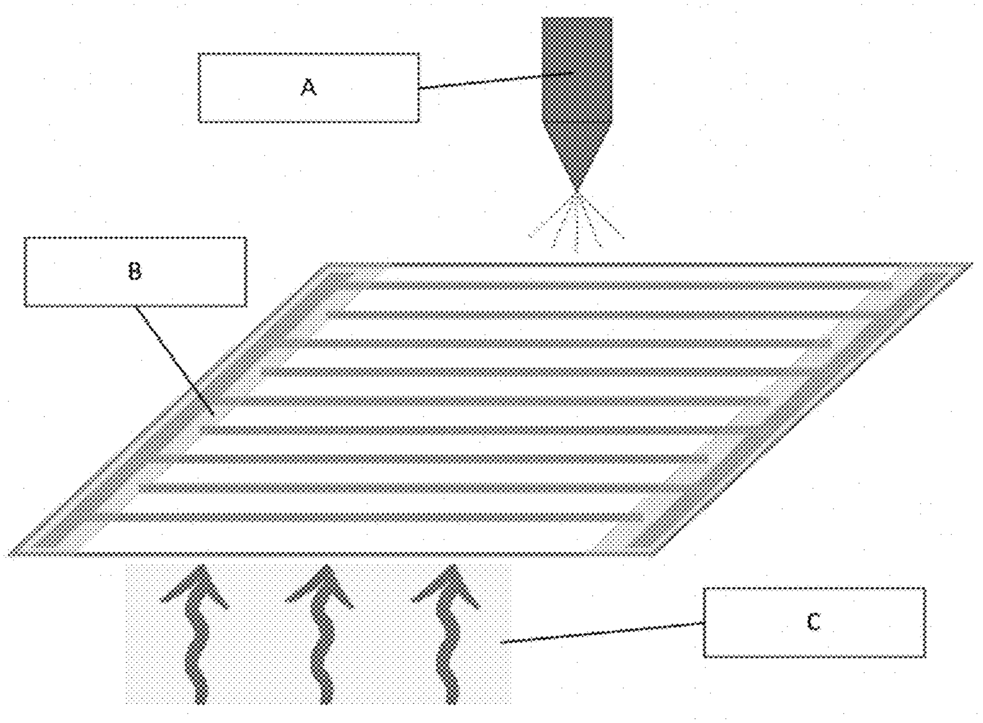
FIG. 4 shows a schematic diagram of preparing a positive temperature coefficient coating by spraying according to Example 2, wherein A represents a second dispersed liquid, B represents a mask, C represents a process of pre-heating a substrate.

The self-regulating electric heating film was prepared according to the following procedures:

(1) polyurethane, hollow glass microspheres and dimethylbenzene were mixed for 30 min under mechanical stirring and ultrasonic condition, obtaining a first dispersed liquid;

(2) the first dispersed liquid was sprayed on a substrate to be treated using a spray gun driven by a compressed air, and then dried to obtain an insulating isolation layer;

(3) an interdigital electrode was arranged on the insulating isolation layer according to FIG. 3;

(4) conductive carbon black, carbon nanotube, EVA, polyurethane and paraffin wax were dissolved in dimethylbenzene for 30 min under mechanical stirring and ultrasonic condition, obtaining a second dispersed liquid;

(5) primary electrodes and the portion 5 mm inward thereof were shield by a mask, and the second dispersed liquid was sprayed on the insulating isolation layer (on which the secondary electrodes were arranged) and the secondary electrodes, during which the substrate to be treated was preheated to 60° C., and the spray gun used and the second dispersed liquid were maintained at 60° C.; after spraying, the resulting product was hot dried at 50° C. until its resistance was stable, obtaining a positive temperature coefficient coating. A spraying process was shown in FIG. 4, wherein A represented a second dispersed liquid, B represented a mask, C represented preheating a substrate; it can be seen from FIG. 4 that it is necessary to preheat the position to be sprayed when spraying the second dispersed liquid;

(6) polyurethane, dimethylbenzene and cubic boron nitride were mixed for 30 min under mechanical stirring and ultrasonic condition, to obtain a third dispersed liquid; and (7) the third dispersed liquid was sprayed using a spray gun driven by a compressed air, and after spraying, the resulting product was thermally baked at 50° C. until its resistance was stable, obtaining a self-regulating electric heating film.

Figure 5:
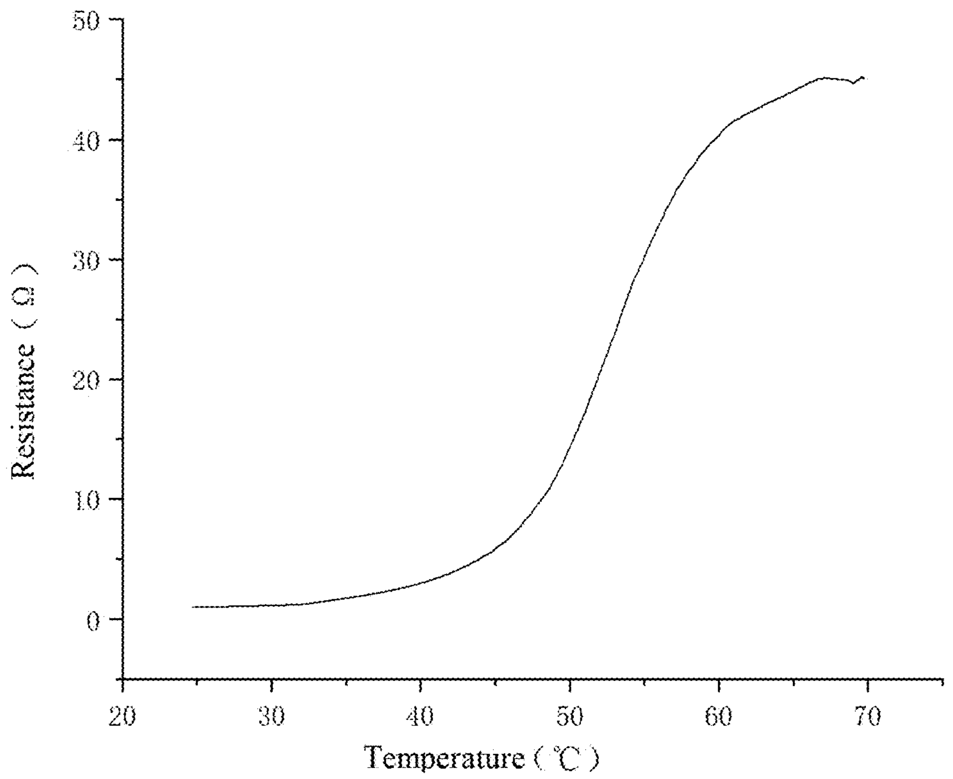
FIG. 5 shows a plot of the resistance of a self-regulating electric heating film versus the temperature thereof.
Figure 6:
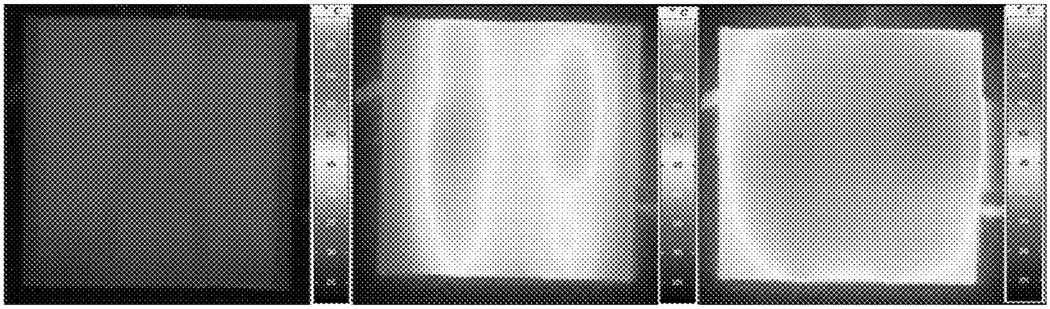
FIG. 6 shows an infrared effect of the self-regulating electric heating film according to Example 2 from unheated to heated.
Figure 7:
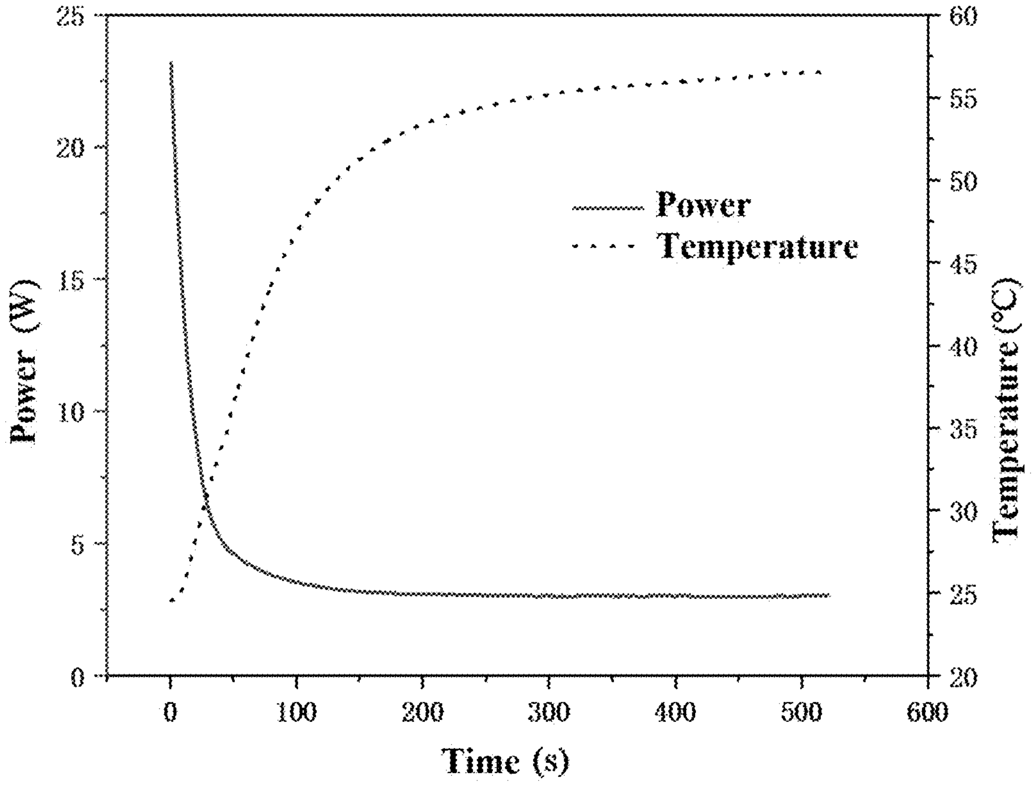
FIG. 7 shows a self-regulating effect of the self-regulating electric heating film according to Example 2.
Figure 8:
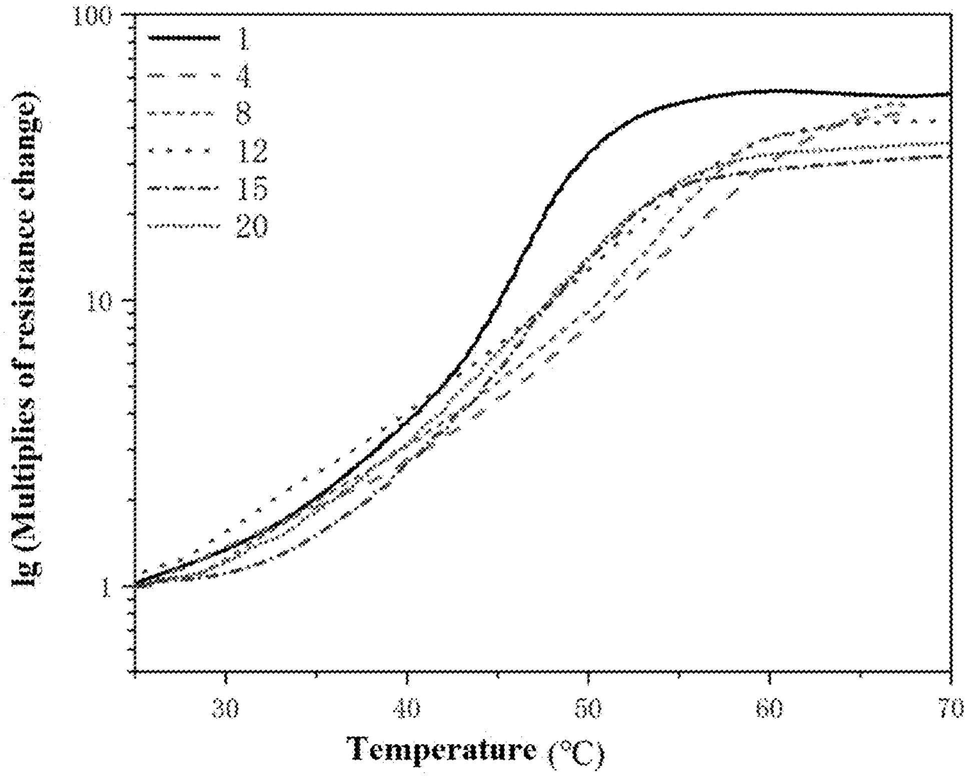
FIG. 8 shows a durability plot of the self-regulating electric heating film according to Example 2.
Figure 9:
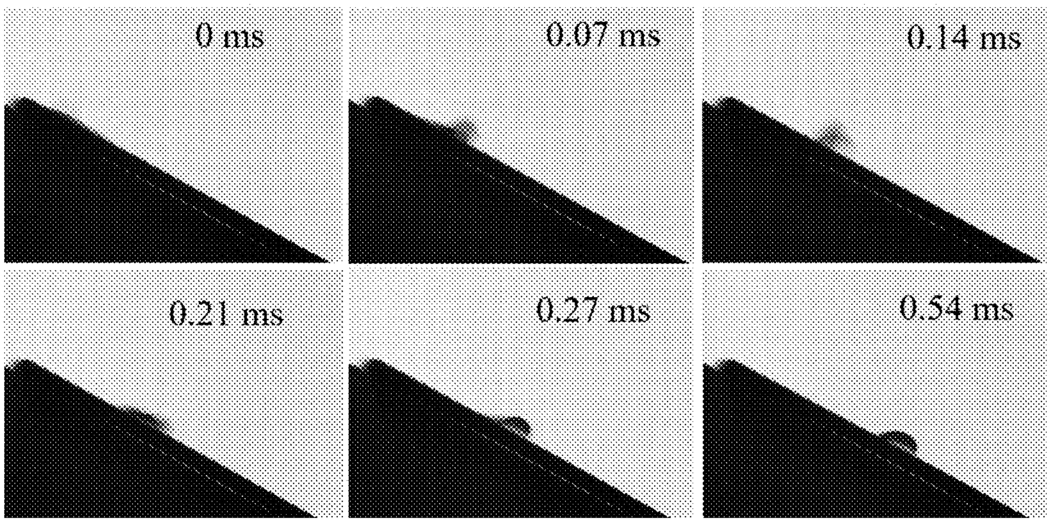
FIG. 9 shows a sliding effect of the self-regulating electric heating film according to Example 2.

The self-regulating electric heating film was subjected to a performance test, and the results were shown in FIGS. 5 to 9, in which, FIG. 5 showed a plot of the resistance of the self-regulating electric heating film versus the temperature thereof, FIG. 6 showed an infrared effect of the self-regulating electric heating film according to Example 2 from unheated to heated, FIG. 7 showed a self-regulating effect of the self-regulating electric heating film according to Example 2, FIG. 8 showed a durability curve of the self-regulating electric heating film according to Example 2, and FIG. 9 showed a sliding effect of the self-regulating electric heating film according to Example 2.

It can be seen from FIG. 5 that the electric heating film exhibits a great adjustability in resistance.

It can be seen from FIG. 6 that, after being electrically heated, the temperature of the electric heating film gradually tends to uniform, indicating that the electric heating film according to this example could generate heat uniformly.

It can be seen from FIG. 7 that with the increase of the electric heating time, the power of the electric heating film decreases rapidly first and then tends to decrease gradually, and finally remains unchanged, while the temperature thereof increases rapidly first and then tends to increase gradually, indicating that the electric heating film according to this example exhibits a self-regulating temperature performance.

As shown in FIG. 8, each curve represents a different heating time, and it can be seen that after being heated for many times, the electric heating film still exhibits a stable PTC performance, indicating that the electric heating film according to the present disclosure exhibits an excellent durability.

It can be seen from FIG. 9 that the ice layer on the surface of the electric heating film gradually melts and moves down over time, exhibits an obvious slip at 0.14 ms, and melts to form droplets at 0.27 ms, indicating that the electric heating film exhibits a good droplet sliding performance.

It can be seen from the above examples that the electric heating film according to the present disclosure exhibits a strong PTC effect, and could be used to achieve self-regulating anti-icing and de-icing when an appropriate voltage is applied.

The above is only preferred embodiments of the present disclosure, and it should be pointed out that for those of ordinary skill in the art, without departing from the principle of the present disclosure, several improvements and modifications could be made, and these improvements and modifications should also be regarded as falling within the protection scope of the present disclosure.

What is claimed is:

1. A self-regulating electric heating film, comprising:

an insulating isolation layer, an interdigital electrode arranged on the surface of the insulating isolation layer, a positive temperature coefficient coating covering the surface of a secondary electrode of the interdigital electrode, and an insulating protective layer covering the surface of a primary electrode of the interdigital electrode, wherein:

the positive temperature coefficient coating is not in contact with the primary electrode of the interdigital electrode;

the insulating protective layer overlaps the positive temperature coefficient coating;

the nano conductive filler is a mixture of conductive carbon black and carbon nanotube, and a mass ratio of the conductive carbon black to the carbon nanotube is 5:1; and the insulating isolation layer has a thickness of 10-30 μm, the positive temperature coefficient coating has a thickness of 30-90 μm, and the insulating protective layer has a thickness of 10-30 μm.

2. The self-regulating electric heating film as claimed in claim 1, wherein the positive temperature coefficient coating comprises 20-40 wt % of a nano conductive filler, 10-30 wt % of a positive temperature coefficient thermosensitive filler, 10-30 wt % of a polymer, and a balance of a phase-change material.

3. The self-regulating electric heating film as claimed in claim 2, wherein the positive temperature coefficient thermosensitive filler includes at least one selected from the group consisting of ethylene-vinyl acetate copolymer, a positive temperature coefficient ceramic powder, polycaprolactone, paraffin wax, and thermoplastic polyurethane.

4. The self-regulating electric heating film as claimed in claim 2, wherein the phase-change material includes at least one selected from the group consisting of a low-temperature lubricating oil, a low-temperature grease, and paraffin wax.

5. The self-regulating electric heating film as claimed in claim 1, wherein an overlap between the insulating protective layer and the positive temperature coefficient coating has a width of not less than 5 mm.

6. The self-regulating electric heating film as claimed in claim 5, wherein the insulating protective layer covers both the primary electrode of the interdigital electrode and a part of the insulating isolation layer.

7. The self-regulating electric heating film as claimed in claim 1, wherein the insulating protective layer covers both the primary electrode of the interdigital electrode and a part of the insulating isolation layer.

* * * * *